United States Patent
Hazard (10) Patent No.: US 7,330,979 B1
(45) Date of Patent: Feb. 12, 2008

(54) METHOD FOR PROTECTING THE PROCESSING OF SENSITIVE INFORMATION IN A MONOLITHIC SECURITY MODULE, AND ASSOCIATE SECURITY MODULE

(75) Inventor: Michel Hazard, Mareil sur Mauldre (FR)

(73) Assignee: CP8 Technologies, Paris (FR)

( * ) Notice: Subject to any disclaimer, the term of this patent is extended or adjusted under 35 U.S.C. 154(b) by 524 days.

(21) Appl. No.: 09/763,868

(22) PCT Filed: Jun. 29, 2000

(86) PCT No.: PCT/FR00/01814

§ 371 (c)(1), (2), (4) Date: Feb. 28, 2001

(87) PCT Pub. No.: WO01/03084

PCT Pub. Date: Jan. 11, 2001

(30) Foreign Application Priority Data

Jun. 30, 1999 (FR) .................................. 99 08409

(51) Int. Cl.
G06F 21/00 (2006.01)

(52) U.S. Cl. ................... 713/193; 713/172; 705/66; 705/71

(58) Field of Classification Search ................ 713/172, 713/193; 380/28, 66, 71, 172, 193; 705/66, 705/71; 711/115, 103; 235/492; 714/759, 714/821, 737
See application file for complete search history.

(56) References Cited

U.S. PATENT DOCUMENTS

| | | | | |
|---|---|---|---|---|
| 4,281,216 A | * | 7/1981 | Hogg et al. ............. | 380/277 |
| 4,382,279 A | * | 5/1983 | Ugon ....................... | 712/37 |
| 4,841,131 A | * | 6/1989 | Iijima ..................... | 235/380 |
| 4,930,129 A | * | 5/1990 | Takahira ................. | 714/766 |
| 5,313,618 A | * | 5/1994 | Pawloski ................ | 703/28 |
| 5,442,704 A | * | 8/1995 | Holtey ................... | 711/163 |

(Continued)

FOREIGN PATENT DOCUMENTS

EP 0 483 978 5/1992

(Continued)

OTHER PUBLICATIONS

Kommerling et al. "Design Principles for Tamper-Resistant Smartcard Processors", Usenix Workshop on Smartcard Technology, May 10-11, 1999.*

(Continued)

Primary Examiner—Kambiz Zand
Assistant Examiner—Tongoc Tran
(74) Attorney, Agent, or Firm—Miles & Stockbridge P.C.; Edward J. Kondracki (57) ABSTRACT

The invention relates to a method and associated security module for protecting the processing of sensitive information in a security module with a monolithic structure, the module comprising information processing means (9) and means for storing (3, 4) information capable of being processed by said processing means. The method comprises the following steps:
- selecting a piece of sensitive information in the storage means;
- determining (7) a specific condition for the integrity of said information;
- reading the information and transmitting (1) it to the processing means;
- verifying (11) during the processing of the information that the specific condition is satisfied; and
- disabling the processing of the information if the specific condition is not satisfied.

20 Claims, 7 Drawing Sheets

U.S. PATENT DOCUMENTS

| | | | |
|---|---|---|---|
| 5,465,349 A * | 11/1995 | Geronimi et al. | 714/30 |
| 5,649,090 A * | 7/1997 | Edwards et al. | 714/10 |
| 5,819,023 A * | 10/1998 | Klingler | 714/34 |
| 5,826,007 A * | 10/1998 | Sakaki et al. | 714/42 |
| 5,978,865 A * | 11/1999 | Hansen et al. | 710/22 |
| 6,357,046 B1 * | 3/2002 | Thompson et al. | 715/139 |
| 6,389,536 B1 * | 5/2002 | Nakatsuyama | 713/165 |
| 6,536,034 B1 * | 3/2003 | Nassor | 717/110 |

FOREIGN PATENT DOCUMENTS

| | | | |
|---|---|---|---|
| EP | 0 483 978 A | | 5/1992 |
| EP | 0 526 055 | | 2/1993 |
| EP | 0 526 055 A | | 2/1993 |
| FR | 2 594 573 A | | 8/1987 |
| FR | 2594573 | | 8/1987 |
| FR | 2 612 316 A | | 9/1988 |
| FR | 2612316 | | 9/1988 |
| FR | 2 720 173 A | | 11/1995 |
| FR | 2720173 | | 11/1995 |

OTHER PUBLICATIONS

Anderson et al. "Low Cost Attacks on Tamper Resistant Devices", Security Protocols, 5th International Workshop, Proceedings, Paris France, Apr. 7-9, 1997.*

"CSL Bulletin for FIPS 140-1", http://itl.nist.gov/fipspubs/bul-1401.htm, Aug. 2000.*

"Security Requirements for Cryptographic Modules", Federal Information Processing Standard Publication 140-1, Jan. 11, 1994.*

Anderson et al., "Tamper Resistance—a Cautionary Note", http://www.cl.cam.ac.uk/users/rja14/tamper.html.*

Boneh et al., "On the Importance of Checking Computations", http://www.bellcore.com, 1996.*

Schneier, "The 1998 Crypto Year-in-Review", http://www.Scheier.com/essay-015.html.*

* cited by examiner

FIG. 1

| High-order Low-order | 0 0000 | 1 0001 | 2 0010 | 3 0011 | 4 0100 | 5 0101 | 6 0110 | 7 0111 | 8 1000 | 9 1001 | A 1010 | B 1011 | C 1100 | D 1101 | E 1110 | F 1111 |
|---|---|---|---|---|---|---|---|---|---|---|---|---|---|---|---|---|
| 0 0000 | BRSET0 | BSET0 | BRA | NEG | NEG | NEG | NEG | NEG | RTI |  |  | SUB | SUB | SUB | SUB | SUB |
| 1 0001 | BRSET1 | BSET1 | BRN |  |  |  |  |  | RTS |  | CMP | CMP | CMP | CMP | CMP | CMP |
| 2 0010 | BRSET2 | BSET2 | BHI |  |  |  |  |  | SWI |  | SBC | SBC | SBC | SBC | SBC | SBC |
| 3 0011 | BRSET3 | BSET3 | BLS | COM | COM | COM | COM | COM |  |  | CPX | CPX | CPX | CPX | CPX | CPX |
| 4 0100 | BRSET4 | BSET4 | BCC | LSR | LSR | LSR | LSR | LSR |  |  | AND | AND | AND | AND | AND | AND |
| 5 0101 | BRSET5 | BSET5 | BCS |  |  |  |  |  |  |  | BIT | BIT | BIT | BIT | BIT | BIT |
| 6 0110 | BRSET6 | BSET6 | BNE | ROR | ROR | ROR | ROR | ROR |  |  | LDA | LDA | LDA | LDA | LDA | LDA |
| 7 0111 | BRSET7 | BSET7 | BEQ | ASR | ASR | ASR | ASR | ASR |  | TAX |  | STA | STA | STA | STA | STA |
| 8 1000 | BRCLR0 | BCLR0 | BHCC | LSL | LSL | LSL | LSL | LSL |  | CLC | EOR | EOR | EOR | EOR | EOR | EOR |
| 9 1001 | BRCLR1 | BCLR1 | BHCS | ROL | ROL | ROL | ROL | ROL |  | SEC | ADC | ADC | ADC | ADC | ADC | ADC |
| A 1010 | BRCLR2 | BCLR2 | BPL | DEC | DEC | DEC | DEC | DEC |  | CLI | ORA | ORA | ORA | ORA | ORA | ORA |
| B 1011 | BRCLR3 | BCLR3 | BMI |  |  |  |  |  |  | SEI | ADD | ADD | ADD | ADD | ADD | ADD |
| C 1100 | BRCLR4 | BCLR4 | BMC | INC | INC | INC | INC | INC |  | RSP |  | JMP | JMP | JMP | JMP | JMP |
| D 1101 | BRCLR5 | BCLR5 | BMS | TST | TST | TST | TST | TST |  | NOP | BSR | JSR | JSR | JSR | JSR | JSR |
| E 1110 | BRCLR6 | BCLR6 | BIL |  |  |  |  |  | WAIT |  | LDX | LDX | LDX | LDX | LDX | LDX |
| F 1111 | BRCLR7 | BCLR7 | BIH | CLR | CLR | CLR | CLR | CLR |  | TXA |  | STX | STX | STX | STX | STX |

FIG. 2

| High-order / Low-order | 0 (0000) | 1 (0001) | 2 (0010) | 3 (0011) | 4 (0100) | 5 (0101) | 6 (0110) | 7 (0111) | 8 (1000) | 9 (1001) | A (1010) | B (1011) | C (1100) | D (1101) | E (1110) | F (1111) |
|---|---|---|---|---|---|---|---|---|---|---|---|---|---|---|---|---|
| 0 (0000) | FRD | RTI | BSET0 | BSET0 | BRA | NEG | NEG | NEG | NEG | NEG | SUB | SUB | SUB | SUB | SUB | SUB |
| 1 (0001) | FRD | RTS | BSET1 | BSET1 | BRN | FRD | FRD | FRD | FRD | FRD | CMP | CMP | CMP | CMP | CMP | CMP |
| 2 (0010) | FRD | FRD | BSET2 | BSET2 | BHI | FRD | FRD | FRD | FRD | FRD | SBC | SBC | SBC | SBC | SBC | SBC |
| 3 (0011) | FRD | SWI | BSET3 | BSET3 | BLS | COM | COM | COM | COM | COM | CPX | CPX | CPX | CPX | CPX | CPX |
| 4 (0100) | FRD | FRD | BSET4 | BSET4 | BCC | LSR | LSR | LSR | LSR | LSR | AND | AND | AND | AND | AND | AND |
| 5 (0101) | FRD | FRD | BSET5 | BSET5 | BCS | FRD | FRD | FRD | FRD | FRD | BIT | BIT | BIT | BIT | BIT | BIT |
| 6 (0110) | FRD | FRD | BSET6 | BSET6 | BNE | ROR | ROR | ROR | ROR | ROR | LDA | LDA | LDA | LDA | LDA | LDA |
| 7 (0111) | TAX | FRD | BSET7 | BSET7 | BEQ | ASR | ASR | ASR | ASR | ASR | STA | STA | STA | STA | STA | FRD |
| 8 (1000) | CLC | FRD | BCLR0 | BCLR0 | BHCC | LSL | LSL | LSL | LSL | LSL | EOR | EOR | EOR | EOR | EOR | EOR |
| 9 (1001) | SEC | FRD | BCLR1 | BCLR1 | BHCS | ROL | ROL | ROL | ROL | ROL | ADC | ADC | ADC | ADC | ADC | ADC |
| A (1010) | CLI | FRD | BCLR2 | BCLR2 | BPL | DEC | DEC | DEC | DEC | DEC | ORA | ORA | ORA | ORA | ORA | ORA |
| B (1011) | SEI | FRD | BCLR3 | BCLR3 | BMI | FRD | FRD | FRD | FRD | FRD | ADD | ADD | ADD | ADD | ADD | ADD |
| C (1100) | RSP | FRD | BCLR4 | BCLR4 | BMC | INC | INC | INC | INC | INC | JMP | JMP | JMP | JMP | JMP | FRD |
| D (1101) | NOP | FRD | BCLR5 | BCLR5 | BMS | TST | TST | TST | TST | TST | JSR | JSR | JSR | JSR | JSR | BSR |
| E (1110) | FRD | FRD | BCLR6 | BCLR6 | BIL | FRD | FRD | FRD | FRD | FRD | LDX | LDX | LDX | LDX | LDX | LDX |
| F (1111) | TXA | WAIT | BCLR7 | BCLR7 | BIH | CLR | CLR | CLR | CLR | CLR | STX | STX | STX | STX | STX | FRD |

METHOD FOR PROTECTING THE PROCESSING OF SENSITIVE INFORMATION IN A MONOLITHIC SECURITY MODULE, AND ASSOCIATE SECURITY MODULE

FIELD OF THE INVENTION

The present invention relates to a method and a device for increasing the security of a monolithic security module comprising a microprocessor and designed to execute a program to be protected. A program to be protected is a set of instructions whose execution must meet criteria such as: authentication of the user, confidentiality of the data exchanged, authenticity and validity of a transaction, and generally, application data processing in which a user's rights and obligations are controlled. The object of the present invention is to provide the security module with means for detecting and counteracting fraudulent external interventions for accessing sensitive data by circumventing intrinsically known prior controls.

BACKGROUND OF THE INVENTION

The term monolithic "security module" covers any electronic circuit constituted by a single silicon chip and encased in a container, the circuit comprising a central processor, at least one memory, and peripherals such as input/output circuits, interrupt controllers, etc. The security module can take the form of an integrated circuit or a portable object of the chip-card type used, for example, in the banking field, in mobile radiotelephones, pay television decoders, health, transportation, etc.

The security modules according to the invention include at least one microprocessor, a memory containing a program and input/output means for communicating with the outside. The memory contains at least one application program that can be written into a memory of the ROM type during the manufacture of the circuit or subsequently written into a programmable memory. Generally, the program contains the instructions executed by the microprocessor, the instructions being transferred from the ROM or nonvolatile memory to the microprocessor through a data bus coupled with an address bus. If the bus paths are too long, the manufacturer of the circuit places amplifier circuits at the ends of the buses so that the binary signal is correctly propagated along its entire length.

Amplifier circuits require high input impedance, which makes them susceptible to external interference. When subjected to elementary particle radiation, they can be saturated for a certain amount of time, and no matter what the incoming data, emit only 0 volt or +Vcc through the bus, i.e. a binary "0" or "1." This radiation may be constituted by alpha rays, X-rays, or positively or negatively charged ions depending on whether an output of "0" or "1" from the amplifier is desired.

A hacker in possession of an authentic card may try to evade the security devices in order to misuse services: he will then subject the security module to such radiation, hoping to interfere with its operation to his advantage. The emission source can be short enough to interfere with the execution of only one or several instructions. This interference can replace the value read in the memory of the program with another value imposed by the emission of the radiation. Thus, the program flow is different and the hacker can use this to his advantage.

A first way to counteract this type of attack is to install radiation sensors; as soon as these sensors detect any abnormal radiation, they set a flag that can be read by the program. Such a solution is described in U.S. Pat. No. 5,465,349, the American equivalent of French patent 2 688 274. But hackers have improved the means of investigation and are using emitters of extremely fine radiation. By aiming the radiation only at the amplifiers or at a group of amplifiers, the sensors no longer detect the fraud. No matter what, this counterattack is incapable of detecting an intervention by means of micropoints, and in any case it is possible to disturb the sensors' read sequence so that the program runs as though nothing abnormal has been detected.

SUMMARY OF THE INVENTION

The object of the invention is to detect alterations in the transmission of the instructions and the data between a memory and a microprocessor. The problem that the invention seeks to solve is the detection of an external intervention attempting to interfere with the flow of a program by modifying the value of the signals exchanged through the busses of a microcontroller.

This problem is solved according to the invention by providing for measurements that allow the security modules to verify whether the information is flowing properly through the module and whether the programs have been fully executed. If not, the normal execution of the program is interrupted. Optionally, any further utilization of the module is prohibited, because the module has detected that it is being used illicitly.

More precisely, the invention claims a method for protecting the processing of sensitive information in a security module with a monolithic structure, the module comprising information processing means and means for storing information capable of being processed by said processing means, characterized in that it comprises the following steps:

selecting a piece of sensitive information in the storage means;

determining a specific condition for the integrity of said information;

reading the information and transmitting it to the processing means;

verifying during the processing of the information that the specific condition is satisfied;

disabling the processing of the information if the specific condition is not satisfied.

BRIEF DESCRIPTION OF THE DRAWINGS

Other characteristics and advantages of the present invention will emerge during the following description of several preferred but non-limiting embodiments, in reference to the attached drawings, in which.

DESCRIPTION OF THE PREFERRED EMBODIMENTS

Figure 1:
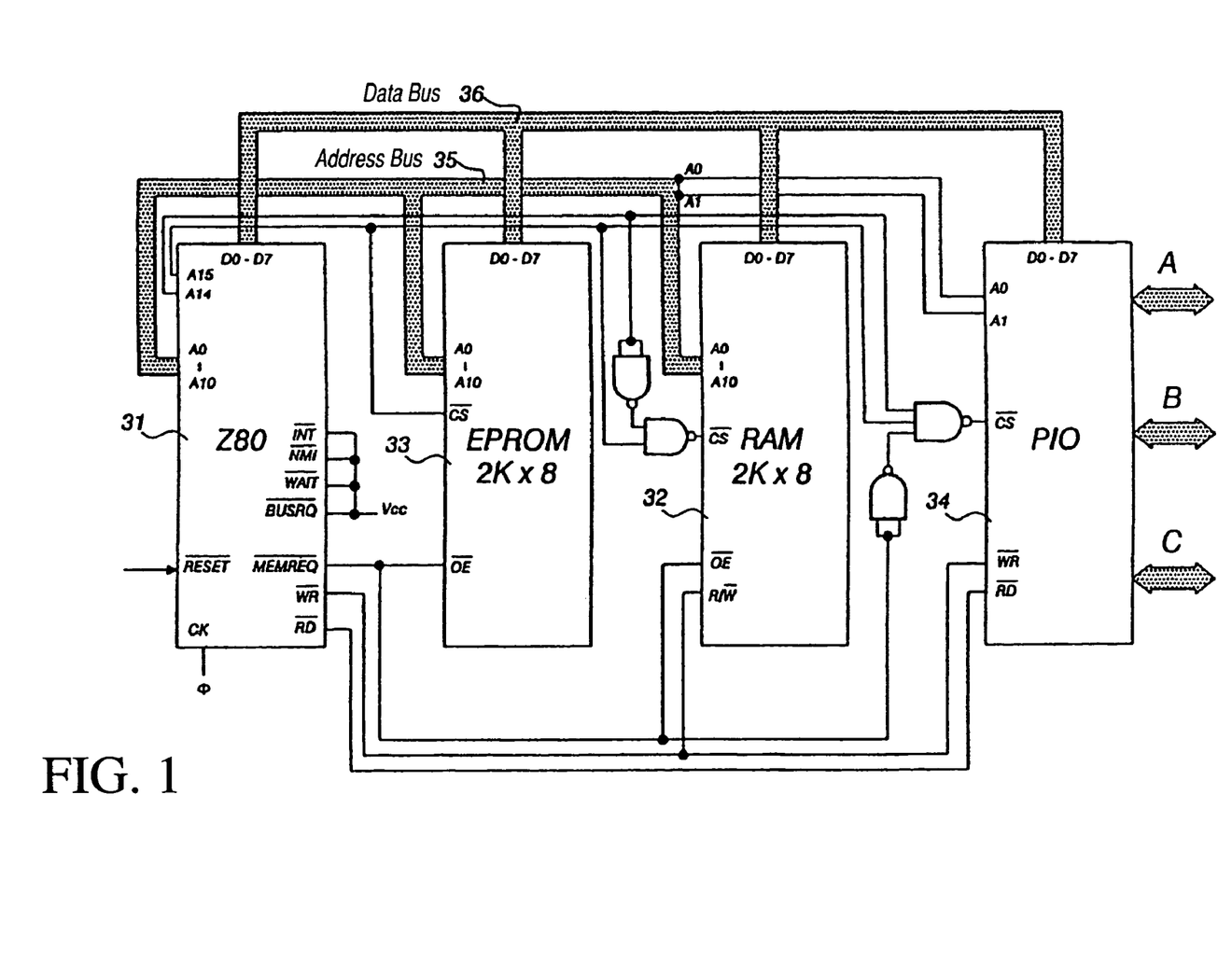
FIG. 1 represents the diagram of a conventional microprocessor system.

The wiring diagram of a microprocessor system is represented in FIG. 1. This diagram is extracted from the book *Architecture de l'Ordinateur* (*Computer Architecture*) by Andrew Tanenbaum, published by InterEditions. The system comprises, in an intrinsically known way, the following elements: a microprocessor 31, a RAM 32, a program memory EEPROM 33 containing the executable program, and input/output means 34. The these various elements are connected by two busses, the address bus 35 and the data bus 36. It is customary to refer to the bus that carries the set of signals such as the clock signals, the read and write signals, etc., as the "control bus."

Depending on the operation executed, these elements can be in information receiving mode or information sending mode. When the microprocessor reads an instruction in a byte at a certain address, the eight cells of the ROM constituting the byte corresponding to this address send the value written in the cells through the data bus, which transmits them to the microprocessor, the latter being in receiving mode. Conversely, when the microprocessor sends a piece of data to the memory, the data bus is in the sending mode. The internal operation of the component is detailed in U.S. Pat. No. 4,382,279, the American equivalent of French patent 2 461 301.

Figure 2:
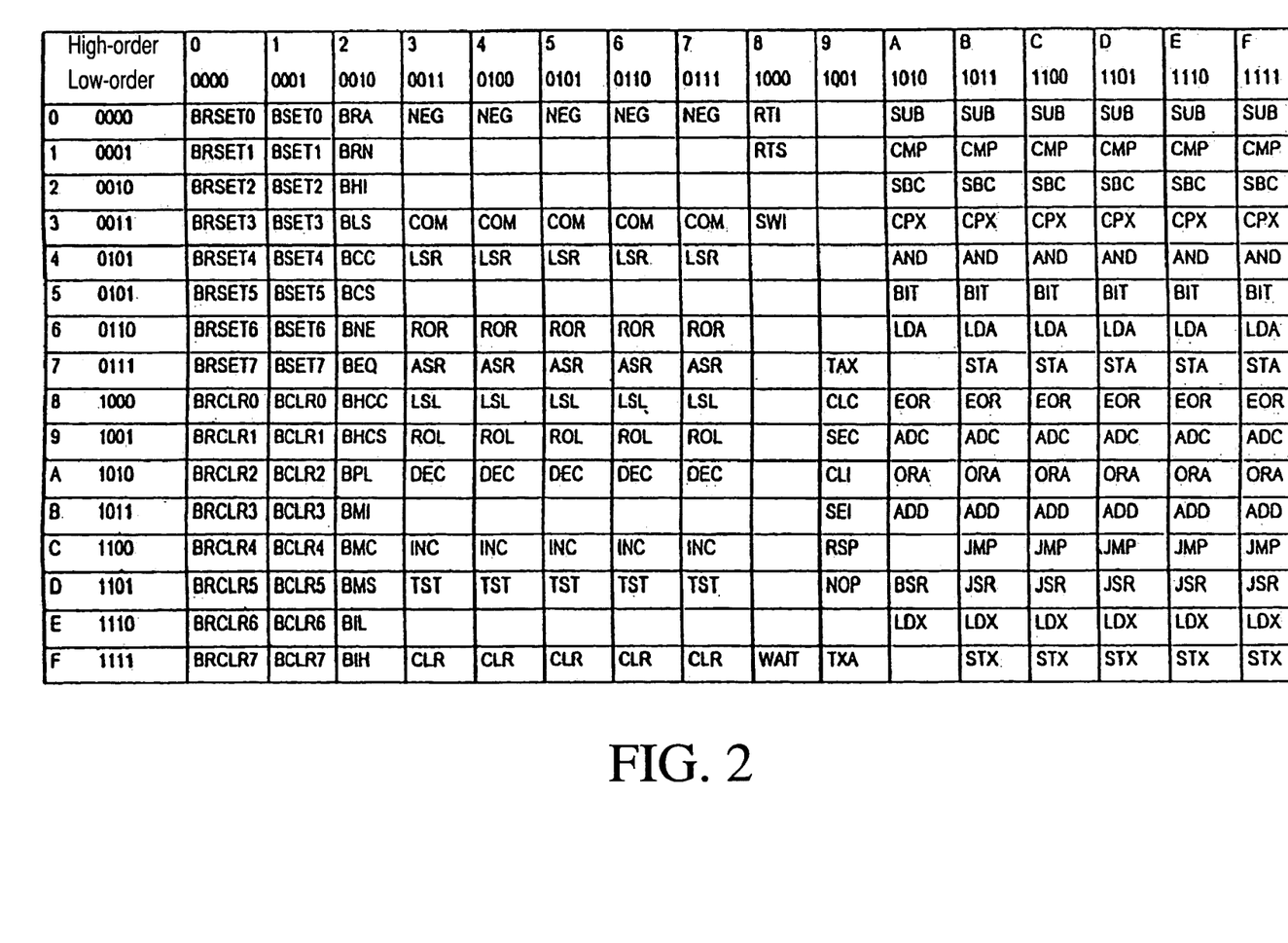
FIG. 2 shows the instruction set of the MOTOROLA 6805 processor.

Each microprocessor has a specific instruction set. The MOTOROLA 6805 microprocessor processes eight-bit data internally. Its data bus comprises 8 lines and the operation code of its instructions is coded into 8 bits. For example, the instruction set of the M6805 and M1468805 microprocessors, extracted from the documentation "Microcomputer/ Microprocessor User's Manual" is represented in FIG. 2. An instruction for this type of microprocessor is coded into 8 bits, hence there are 256 different codes, but not all of them are executable by the microprocessor. Certain codes are not implemented and correspond to holes in the table of FIG. 2, for example the codes: 90H, 31H, 41H, 51H, 61H, 71H, 91H, 23H, 24H, 25H, 26H, 27H, 28H 29H, 93H, 94H, etc. If the microprocessor reads an operation code that is not implemented, its execution is not guaranteed. Thus, the microprocessor can jump to the next instruction without doing anything else.

As may be seen in FIG. 2, the code "00" of the instruction set of the MOTOROLA 6805 microprocessor corresponds to the instruction "BRSET0" and the code "FF" corresponds to the indexed instruction "STX". The instruction "BRSET0" takes up three bytes in the program memory and is executed in ten clock cycles; the instruction "STX" takes up one byte and is executed in five clock cycles. The microprocessor has a ordinal counter containing the address of the instruction in the program memory that is currently being executed. As stated in the preamble, if a hacker sends radiation through the bus, one or another of these instructions will be executed instead of the one actually read in the program memory. In the case of the instruction "BRSET0", after its execution, the ordinal counter of the microprocessor is increased by three units and hence points three bytes further ahead in the program memory. For the instruction "STX", the ordinal counter is increased by one unit. By emitting the radiation during the ten clock strokes required for the execution of BRSET0, the microprocessor will read three bytes at "00", and translate this into "test whether the bit 0 of the byte 00 is at 1 and jump if that is the case". Because of the radiation, the value 00 of the byte at the address 00 is read, so the jump does not happen and the program continues with the next instruction. Thus, by subjecting the circuit to radiation for a certain number of clock pulses, a hacker can artificially advance the ordinal counter in successive three-byte jumps, and prevent the execution of a sequence written in program memory. For a microprocessor from the 8051 family produced by the INTEL company and various other companies, the operation code whose binary value is 00 corresponds to the instruction NOP, which means "no operation." This instruction uses only one byte. In this case, the hacker can artificially advance the ordinal counter byte by byte.

Figure 3:
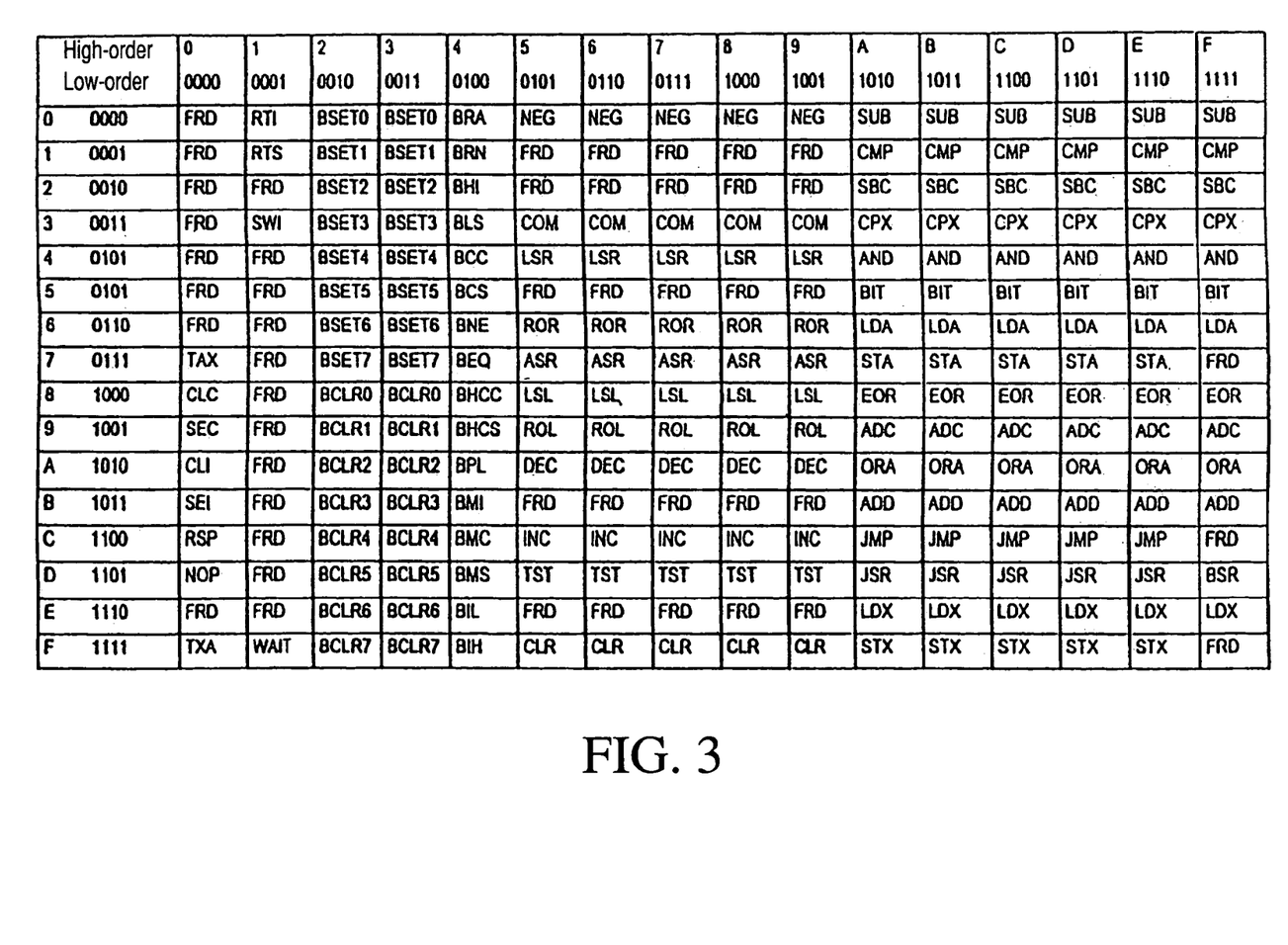
FIG. 3 shows the modified instruction set of the microprocessor according to the invention.

A first solution consists of interrupting the normal operation of the microprocessor during the reading of an instruction whose code is "00" or "FF". The module becomes mute; just one power-down followed by one power-up of the module can restart the microprocessor. FIG. 3 shows the modified instruction set according to the invention. The new instruction corresponding to "00" or "FF" is called "FRAUD", abbreviated FRD. Compared to the normal instruction set described in FIG. 2, some of the columns have been inverted so that the codes "00" and "FF" no longer correspond to executable instructions. Column number "0", which contained the instruction "BRSET0" is transferred to column 2; column number "F" which contained the instruction "STX" is transferred to column A. The columns are transferred by modifying the mask of the circuit, in the element that decodes the four most significant bits of the operation code of the instructions. It would also be possible to modify the decoding of the four least significant bits of the operation code, but it wasn't necessary for this microprocessor model.

The program does not contain a "FRAUD" instruction. The progammer who writes an application program is careful not to implement such instructions in his program.

As shown in FIG. 3, the solution can be generalized to all of the operation codes that do not correspond to an instruction recognizable by the microprocessor. Thus, the new "FRAUD" instruction is assigned to all the codes not used, such as: 01H, 02H, 03H, 04H, 05H, 06H, 0EH, 12H, 14H, 15H, 16H, 17H, 18H, 19H, 1AH, and so on up to FFH • 47 different operation codes in all, all of which execute the same "FRAUD" instruction.

In a variant, this interruption triggers an instruction microprogrammed into the microprocessor. This type of instruction executes a non-reversible instruction of the type for writing a code into nonvolatile memory. When the next power-up occurs, the reset management circuit tests the value of this code in nonvolatile memory and disables the operation of the microprocessor. The microprogrammed instruction triggers an operation for definitively disabling the circuit. Microprogrammed instructions have the advantage of being resident in the heart of the microprocessor and hence their execution cannot be interrupted or altered by radiation acting on the bus. It is therefore impossible to detect the execution of a microprogrammed disable instruction.

Figure 4:
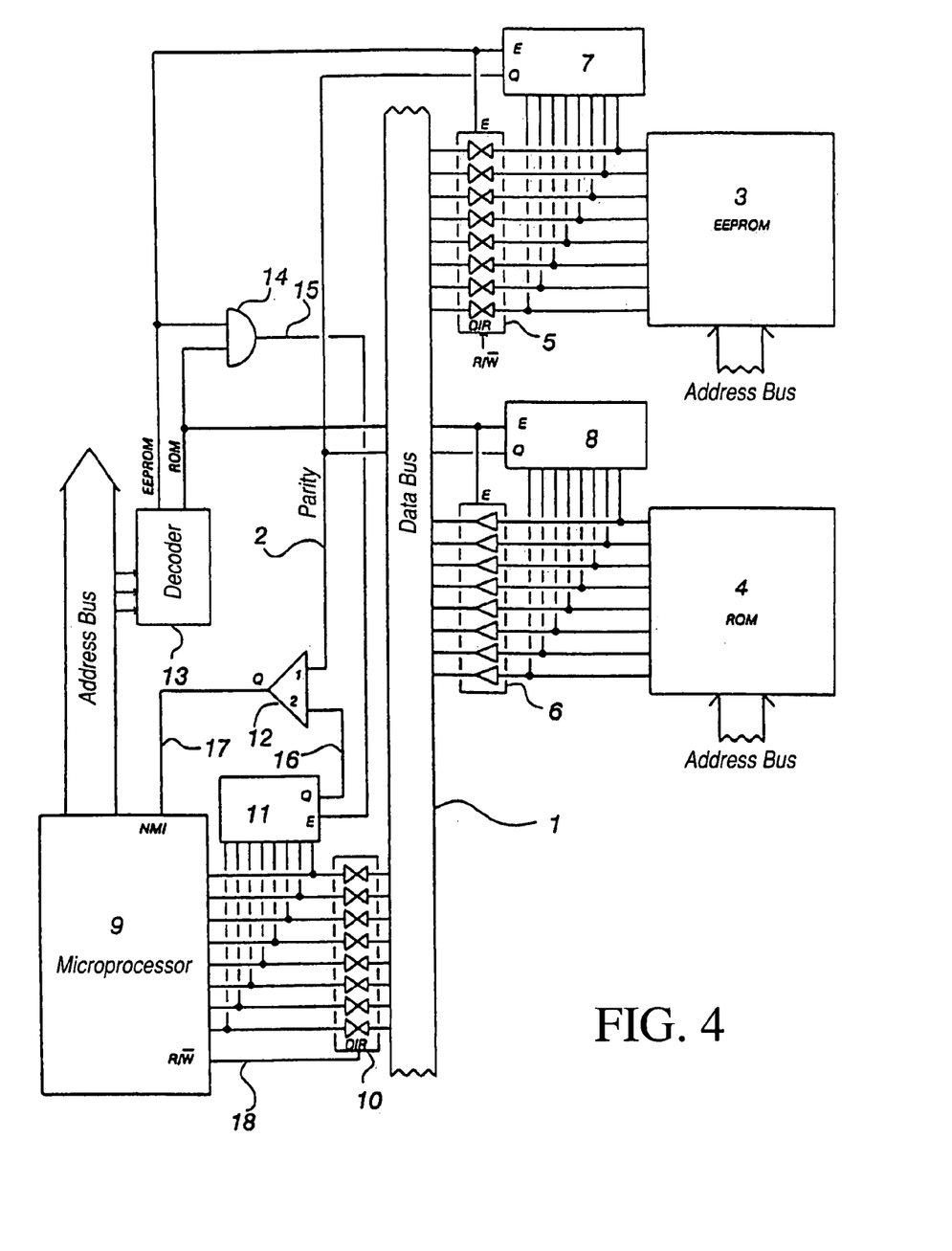
FIG. 4 shows a block diagram of the modified circuit according to the invention.

A second solution for detecting the disturbance of a piece of data in a bus is to implement an integrity check from one end of the busses to the other. FIG. 4 shows the wiring diagram with its bus integrity controller.

Added to the eight lines of the data bus 1 is a ninth line, marked PARITY 2, whose logical state corresponds to the parity value calculated from the eight pieces of binary information present in the data bus. As stated above, the operation codes of the various instructions of a program are read from the ROM 3 or from nonvolatile programmable memory 4, EEPROM for example. The signal output from a memory cell, whose value represents the binary data stored by this cell, is too weak to reach the microprocessor via the data bus. In order for these signals to reach the microprocessor, amplifier circuits 5 and 6 are installed just after the cells of the memories EEPROM and ROM and before the bus. These two circuits have a control input E that makes it possible to activate their output. If the signal E has a level "1," the eight outputs are not active.

They are in a state of high impedance. The EEPROM being read-and write-accessible, the amplifier circuit 5 is two-way. The direction of the data transfers is controlled by the microprocessor through the READ/WRITE control line 18.

The means for checking the integrity of the data read in the memory cells comprise parity generators 7, 8 and 11, a comparator 12 and a non-maskable interrupt input called "NMI" connected to the microprocessor. The parity generators 7, 8 and 11 calculate the parity value of the data present in eight inputs. For example, the circuit 74HC280 manufactured by National Semiconductor is a parity generator available in the form of an integrated circuit. Its structure can be fully integrated into the monolithic circuit. The parity generators also have an output line Q whose state represents the parity value of the data applied to the eight inputs and a control line E that activates the output Q when 0 volt is applied to it. In this case, the output line Q is at 0 volt if the number of inputs at +Vcc is even, or at +Vcc if the number of intputs at +Vcc is odd. When +Vcc is applied to the input E, the output line Q is in a state of high impedance. The parity generator 7 calculates the parity of the data selected in the EEPROM, the parity generator 8 calculates the parity of the data selected in the ROM and the parity generator 11 calculates that present in the microprocessor.

The microprocessor 9 also has an amplifier circuit 10 for ensuring the compatibility of the signals flowing through the data, address and control busses. This amplifier circuit connected to the data bus 10 is two-way; on one end, it amplifies the data signals that the microprocessor sends to the memories and to the peripherals; on the other end it amplifies the signals received by these same memories and peripherals so that the signals are correctly processed by the internal circuits of the microprocessor. Most microprocessors have a "fetch" device that makes it possible, in the same clock cycle, to execute an instruction and to read the operation code of the next instruction.

The microprocessor 9 controls the address bus; the value applied to this bus determines which type of peripheral is selected. In order to reduce the number of selection lines, an address decoder 13 receives the address bus in an input and selects the various peripherals and memories through specialized lines: the line called "EEPROM" selects the EEPROM and the line "ROM" selects the ROM. Each of these two lines is connected to the memory and to the corresponding parity generator.

The lines EEPROM and ROM are active in the 0 state. The output of the AND gate 14 generates a selection signal common to both memories; if one of the two lines EEPROM and ROM is at "0", the line 15 is also at "0". The line 15 is connected to the input E of the parity generator 11 which, as a result, is active at the same time as one of the parity generators 7 or 8. If no memory is selected, the output lines 2 and 16 of the generators are in the high impedance state.

The output lines 2 and 16 of the generators are respectively connected to each of the two inputs of the comparator 12. The output Q of the comparator is connected to an interrupt input of the microprocessor (marked "NMI" in FIG. 4).

When in use, the microprocessor reads an operation code representing an instruction in the ROM. It applies the address of the code to the address bus, which activates the line ROM, and consequently the amplifiers 6 and the parity generators 8 and 11. The amplifiers send the data read in the ROM to the data bus, and the parity generator calculates the parity value of said data, then sends the value to the comparitor 12 through the PARITY line 2. The microprocessor reads the data through the two-way amplifiers 10. The parity generator 11, activated by the line 15, calculates the parity value of the data read by the microprocessor and sends it to the comparator through the line 16. The comparator 12 compares the two values: if they are equal, the output is at the level "1"; if they are different, the output is at "0". In the latter case, the data has been altered, very likely due to a fraudulent emission of radiation. The output of the comparator is connected by the line 17 to the input "NMI" of the microprocessor. A "0" level triggers a non-maskable interrupt, which results in a redirection of the current program to an interrupt routine. The activation of the comparator can take place during the fetch phase; thus the generation of the interrupt is perfectly synchronized with the sequencing clock of the microprocessor.

The operation is identical when the microprocessor performs a read of the EEPROM.

In a simplified embodiment of the invention, the input "NMI" is similar to the RESET input of the microprocessor. When the input becomes inactive again, the microprocessor is enabled and starts its program in the same way as during a power-up. Thus, an external intervention cannot control the microprocessor which, as long as it is subjected to this radiation, is disabled.

Compared to the first solution, which seeks to verify that an operation code is correctly read, this second solution offers the advantage of controlling any data type: operation code or data. Parity generators can also be installed in the address bus in the same way as in the data bus. This second solution also offers the advantage of controlling the signals of the address bus.

In a variant, a level "0" in the "NMI" input triggers the execution of a microprogram. In order to prevent transient phenomena, the recognition of the level of the signal in the "NMI" input takes place during a transition of the clock of the microprocessor, a transition during which the data analyzed by the parity signal comparator is valid. The operation of a conventional interrupt handling program written into the ROM would be disturbed by the hacker. According to the invention, on the other hand, a microprogram is resident in the microprocessor; it does not read data through the bus; therefore its execution cannot be disturbed by radiation acting on the bus. The microprogram, triggered by the application of a level "0" to the "NMI" input, produces two actions: the first is the writing of a flag called "DISABLED" into the programmable nonvolatile memory, and the second is a resetting of the microprocessor. The writing of the flag DISABLED is irreversible: the state of this flag can no longer be modified, either by the microprocessor or by an external means. An initialization circuit, activated when the security module is powered up, tests the state of the flag DISABLED and sets the microprocessor to a permanent RESET state if the flag has been written. Advantageously, this flag can be embodied by a fuse, the melting of which renders the microprocessor unusable.

If a hacker imposes a level "0" on all the lines of the bus, including the PARITY line, the comparator 12 does not detect any error. In essence, the number of lines at "0" being even, the parity signal must be at "0"; the PARITY line is forced to exactly that level. In order to prevent this, according to a variant of the second solution, one uses the fact that parity generators generally have two outputs, one for generating an even parity, the other for generating an odd parity.

Figure 5:
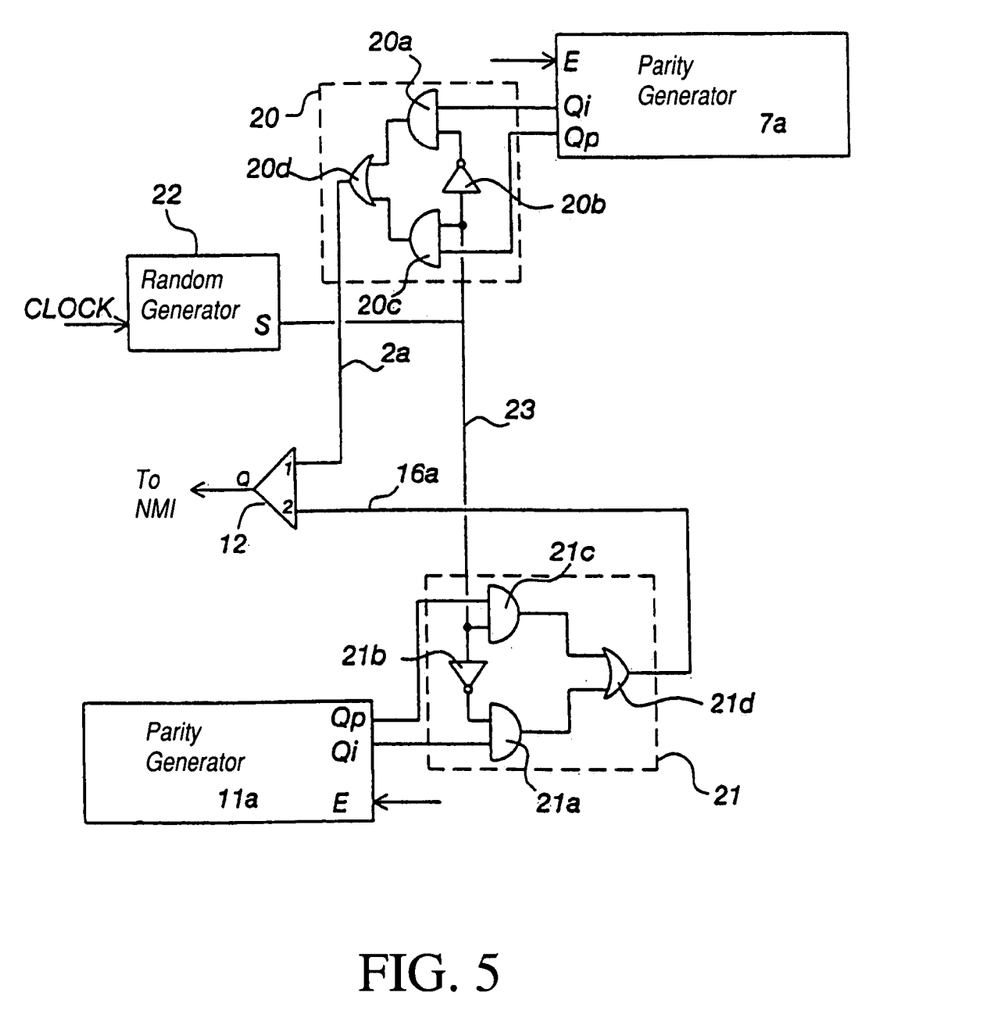
FIG. 5 shows a part of the block diagram of the modified circuit according to an improvement of the invention.

FIG. 5 shows the wiring diagram of the modifications to be made to FIG. 4 in order to integrate programmable parity generator circuits into the monolithic circuit. The elements common to FIG. 4 and FIG. 5 have the same references.

The parity generators 7a, 8a and 11a have two outputs: the one marked Qp is the output for the even parity signal, and the other Qi is the output for the odd parity signal. When the number of input lines at "1" is even, then Qp is at "1" and Qi is at "0"; when the number of input lines at "1" is odd, then Qi is at "1" and Qp is at "0". The circuits 20 and 21, each constituted by two AND gates, one OR gate and one inverter gate, constitute multiplexers. The two inputs of the multiplexers are respectively connected to the two outputs Qi and Qp of the parity generators. A control line marked 23 selects the input. If the line 23 is at "0", the outputs of the gates 20c and 21c are at "0", and with the help of the inverter gates 20b and 20c, the outputs of the gates 20a and 21a as well as those of the gates 20d and 21d reproduce the logical levels of the outputs Qi of the parity generators 7a,11a. In this case, the outputs Qi are selected and the data present in the outputs Qi are sent to the comparator 12. It is the odd parity signals that are compared. If the line 23 is at "1", with the help of the inverter gates 20b and 20c, the outputs of the gates 20a and 21a are at "0", the outputs of the gates 20c and 21c, as well as those of the gates 20d and 21d, reproduce the logical levels of the outputs Qp of the parity generators 7a and 11a. In the latter case, the outputs Qp are selected and the data present in the outputs Qp are sent to the comparator 12. It is the even parity signals that are compared.

The signals of the line 23 are sent by a random signal generator 22. This generator is an electronic circuit that receives through an input line the clock of the microprocessor and delivers a signal "0" and "1" randomly over time. In a simplified way, the random signal generator can be a counter whose output changes its state at each predetermined time interval. The random signal generator 22, the multiplexer 21 and the comparator 12 are located as close as possible to the microprocessor, and preferably integrated into the latter. Thus, they are not very disturbed by a hacker sending radiation through the bus. More complicated circuits using an oscillator inside the random signal generator can be installed. The purpose of this generator is to emit a logical signal through a line whose state changes fairly often, on the order of 100 to 10,000 times per second. It is important to synchronize the line's changes of state with the clock of the microprocessor, in order to avoid accepting the "NMI" line at the precise moment when the signal of line 23 changes; otherwise interference could be produced due to differences in the propagation of the signals.

During use, the hacker subjects the data bus to radiation, which forces the data and parity bits to "1" or to "0". Depending on the binary value, the parity value calculated from the data bits forced by the radiation can be equal to the value forced by the radiation; hence, since they are equal, no error is detected. By frequently changing the parity type by means of the random signal generator, the presence of the radiation is detected immediately.

When the random signal generator 22 emits a level "0", the signals emitted by the outputs Qi of the parity generators 7a and 11a are selected and hence, the parity signals of the odd type are compared. When the random signal generator 22 emits a level "1", the signals emitted by the outputs Qp of the parity generators 7a and 11a are selected and hence, the parity signals of the even type are compared.

Let us distinguish, first of all, the case where the bus is subjected to a radiation that forces the lines of the data and parity busses 2a to "1". When the random signal generator 22 sends a signal "0", the output Qi of the parity generator 11 is selected, and its level, equal to "0", is different from that of the parity line 2a, which is forced to "1". The comparator therefore easily detects this type of radiation, triggering an interrupt. Let's go to the second case, where the bus is subjected to a radiation that forces the lines of the data and parity busses 2a to "0". When the random signal generator 22 sends a signal "1", the output Qp of the parity generator 11 is selected, and its level, equal to "1", is different from that of the parity line 2a, which is forced to "0". In this case, too, the comparator detects the radiation, and signals it to the microprocessor through an interrupt.

This variant adds a paramater that makes the behavor of the circuit even more unpredictable for a hacker, since this parameter increases the difficulty of controlling the state of the bus lines from the outside without the circuit's detecting it.

A third solution for detecting an alteration in the execution of a program is to implement flag modification routines from place to place within a program to be protected, and to verify prior to starting an operation on the sensitive data that all the flags have been modified.

Figure 6:
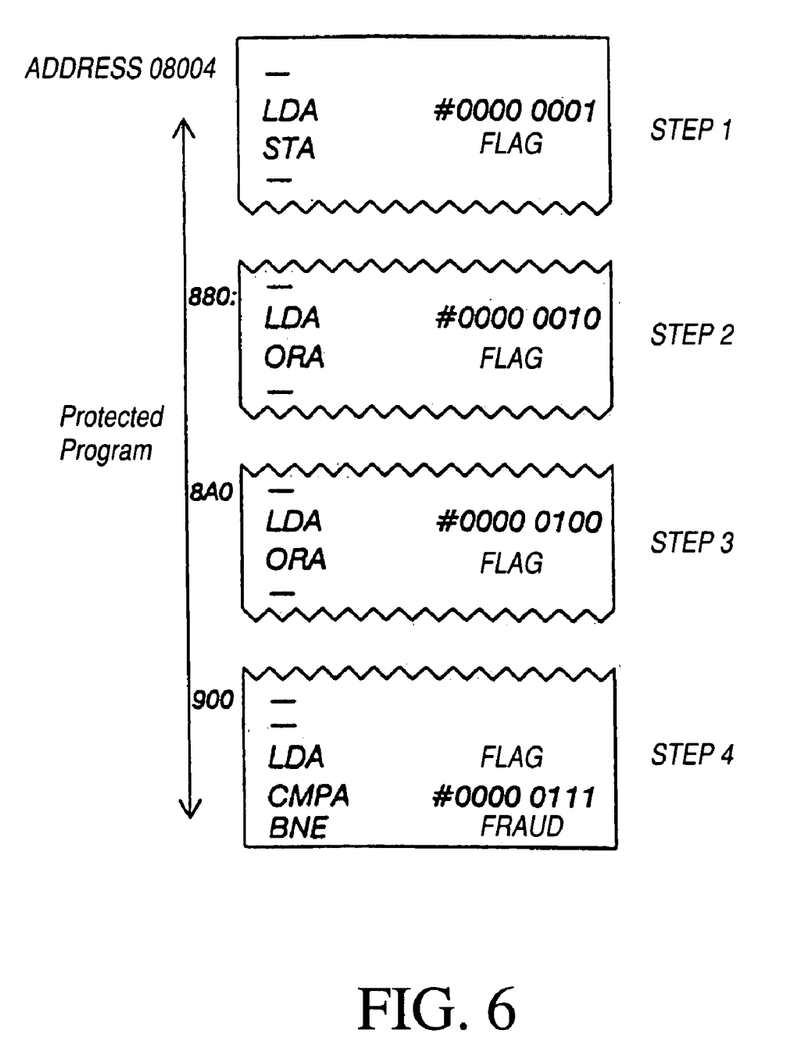
FIG. 6 shows a part of the program memory, equipped with steps for updating and modifying an indicator that makes it possible to detect external interference.

FIG. 6 shows a part of the memory containing a program implemented at the hexadecimal address 0800. This memory can be the ROM or the EEPROM, but any other type of nonvolatile memory capable of executing instructions will work. All the flags are represented by bits and grouped in memory into an indicator. In the example described, this indicator is a byte of the RAM called FLAG. A certain number of bits composing this byte are used to mark the passage to certain steps in the program that lead to an operation on sensitive data.

At the address 800 (step 1), the FLAG byte is set to the binary value "0000 0001", the first bit at "1" indicating that step 1 has been executed. At the address 880H 9step 2) the FLAG byte is read and modified by the execution of a logical OR (the ORA instruction in MOTOROLA 6805) between its current content and the binary value "0000 0010": the result of the OR operation is written into the FLAG byte. At the address 8AOH (step 3), the FLAG byte is read and modified by the execution of a logical OR between its content and the binary value "0000 0100": the result of the OR operation is written into the FLAG byte. Finally, at the address 900H (step 4), the protected part of the program ends: the FLAG byte is read and checked: if its value is different from the binary value "0001 0111", the program jumps to a fraud handling routine.

In use, the program to be protected begins at the address 0800H. The first step (step 1) consists of updating the FLAG byte by setting the first bit of the FLAG byte to "1". Then, the program continues in sequence up to a second, so-called modification step (step 2) in which the second bit of the FLAG byte is set, thus indicating that step 2 has been executed. Consequently, we can assume that all the instructions of the program between step 1 and step 2 have been executed. Then, the program continues in sequence up to the modification step 3, where the third bit of FLAG is set to "1". Finally, the program to be protected ends in a routine for testing the FLAG byte (step 4): it consists of verifying the execution of steps 1, 2 and 3. If the value is different from "0000 0111", a trap of the program occurs, which reveals an abnormal operation, very likely resulting from an attempted fraud. In this case, the program interrupts its normal operation to jump to the fraud handling routine. Since a hacker does not know the places in the program where the routines for modifying the FLAG byte are implemented, he does not know the moments at which they are executed, and therefore, by interfering with the values of the data bus, there is a strong probability that he will succeed in eliminating the execution of at least one of steps 1, 2 or 3, and hence the FLAG byte will not have the expected final value.

In a simplified way, the fraud handling routine can consist in a reset of the microprocessor (RESET). An improvement consists of using a microprogrammed instruction for step 4 so that a hacker cannot interfere with its flow by preventing the execution of certain instructions while allowing others. This instruction has the following structure: "Operation code, Address to be read, Value to be compared": it sequentially executes the following functions:
1 reading the "Address" byte
2 comparing the value of the byte read to "Value"
3 if equal, then jumping to the next instruction
otherwise 4 writing the flag DISABLED into nonvolatile memory
5 RESET of the microprocessor Quite clearly, by increasing the number of flags and hence the number of steps for updating the indicator, one increases the moments at which external interference is detected. The FLAG indicator must therefore be represented by several bytes. But the steps for updating the indicator take up memory space that cannot be used for the application program, both at the level of the program and at the level of the RAM. It is therefore necessary to optimise the number of steps. For example, for a 1000-byte program to be protected, a good compromise would be to install 32 steps for modifying the indicator. These 32 steps and the final test routine take up 162 bytes of program memory and 4 bytes of RAM. Depending on the complexity of the program, which may include jumps and may not perform all of the modification steps, the test of the FLAG byte may involve only a limited number of bits. If the program to be protected ends at different places, several test routines that include different values of the FLAG byte can be installed in the program.

This solution has the advantage of being easy to use in a conventional component because it does not involve modifying the hardware portion of the component.

An improvement of the invention consists of implementing in the program instructions for erasing the FLAG byte in places that are normally never reached during the execution of the program. Thus, a fraudulent interference with the execution of the program can result in the execution of one of these instructions, which, by setting the FLAG byte to 00, results in the execution of the fraud handling routine.

Figure 7:
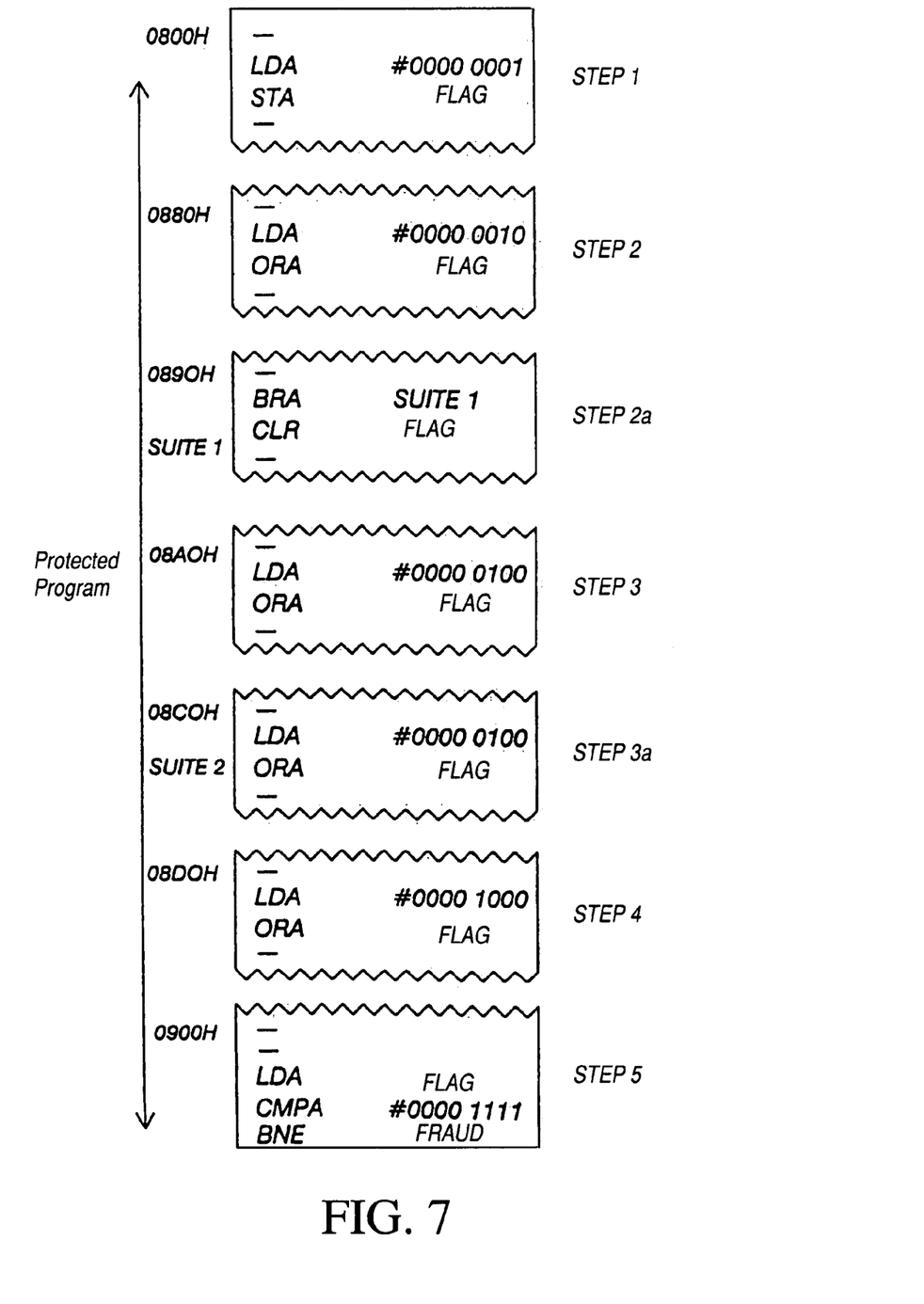
FIG. 7 shows a part of the program memory according to a variant of the invention.

FIG. 7 shows the appearance of the program memory according to the improvement. At the address 0890H (step 2a), the program executes an unconditional jump instruction. The instruction at the next address is therefore never executed, unless another jump instruction specifies it as a destination. The programmer writes an instruction for erasing the FLAG byte just after the unconditional jump instruction, and is careful never to specifiy it as a destination in his program. If a hacker disturbs the data bus, there is a certain level of probability that an unconditional jump instruction will not be executed and that this erase instruction will. This instruction sets all the bits of the FLAG byte to "0". During the final test in step 5, bits 1 and 2 of FLAG are at "0", and hence the value read is not the one expected. The program therefore interrupts its normal operation to jump to the fraud handling routine.

The program illustrated by FIG. 7 shows two steps for erasing the FLAG byte (steps 2a and 3a). The erase instruction takes up only two bytes in program memory, as opposed to four bytes for the steps for updating the indicator, which at an equal level of performance saves space. An optimal program uses fairly few unconditional jump instructions. It is therefore possible to systematically place an erase instruction after an uncondtional jump.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for protecting the processing of sensitive information in a security module having a monolithic structure comprising at least an information processing device, a storage device for storing information capable of being processed by said processing device and at least a data bus, the security module further comprising means for checking the integrity of information, said means for checking the integrity being either a table contained in the processing device or a plurality of software program instructions of the storage device or a specific hardware circuit, the method comprising at least the following steps:
selecting a piece of sensitive information stored in the storage device addressed by the processing means;
determining, by the means for checking the integrity, a specific condition for establishing the integrity of said sensitive information to be transmitted on said data bus;
transferring a datum of said sensitive information from the storage device to the processing device, on said data bus;
verifying said datum transferred on said data bus, by said means for checking the integrity for verifying that said specific condition is satisfied; and
disabling the processing of said sensitive information by the processing device if the specific condition is not satisfied,
wherein said datum of said sensitive information is an operation code datum read in the storage device, said operation code datum being recognized in said table contained in the processing device, said specific condition being satisfied if said operation code datum is equal to a valid operation code datum of the table and said specific condition is not satisfied at least if bits of the operation code datum are all equal to a same binary value.

2. The method according to claim 1, wherein the disabling of the processing of said sensitive information comprises the disabling of the processing device performed by executing a microprogrammed instruction.

3. The method according to claim 2, wherein said microprogrammed instruction induces the following steps:
writing a piece of disable data into a non volatile location of the storage device; and
disabling the processing device.

4. The method according to claim 3, wherein said microprogrammed instruction further comprises the reading by the processing device at said non volatile location of the storage device upon power up of said module, before disabling the processing device if a value read at this location does not match.

5. The method according to claim 1, wherein when determining of a specific condition for the integrity of said information, at least two software instructions of the storage means are executed by processing means for determining said specific condition.

6. The method according to claim 1, wherein when determining of a specific condition for the integrity of said information, the means for checking integrity of information comprises a specific hardware circuit for checking integrity of information in entry of the data bus and at output of the data bus.

7. A security module comprising an electronic circuit having a monolithic structure and comprising an information processing device, an information storage device communicating with said processing device via a data bus, the processing device selecting sensitive information data extracted from the storage device in order to process them, the security module further comprising means for checking the integrity of information being either a table contained in the processing device or a plurality of software program instructions of the storage device or a specific hardware circuit, wherein said means for checking the integrity verifies a specific condition for integrity by verifying a datum of said sensitive information, transferred on the data bus, the security module further comprising means for disabling the processing of said sensitive information by the processing device when said specific condition for integrity is not satisfied,
wherein the datum transferred on the data bus is an operation code datum executed by the processing device corresponding to an instruction extracted from said table, the table comprising at least a forbidden instruction, and
wherein said specific condition for integrity is not satisfied when said processing device processes said forbidden instruction.

8. The security module according to claim 7, wherein at least instructions of said table corresponding to operation code datum constituted by bits all equal to a same binary value are forbidden instructions of said table.

9. The security module according to claim 7, wherein said means for disabling the processing of said sensitive information comprises means for irreversibly writing at least one indicator with an initial valid, state in a non reversible modified invalid state, and means for reading said indicator during the next power-up of the module and disabling the processing device if an invalid state of said indicator is read.

10. The security module according to claim 9, wherein said irreversibly writing of said indicator is performed by executing a microprogrammed instruction.

11. The security module according to claim 7, wherein said security module is a microcircuit card.

12. The security module according to claim 7, wherein the means for checking the integrity comprises at least two software instructions executed by the processing means for verifying said specific condition for integrity.

13. The security module according to claim 7, wherein the means for checking the integrity comprise a specific hardware circuit for checking integrity of information in entry of the data bus and at output of the data bus for verifying said specific condition for integrity.

14. A method for protecting the processing of sensitive information in a security module having a monolithic structure comprising at least an information processing device a storage device for storing information capable of being processed by said processing device and at least a data bus, the security module further comprising means for checking the integrity of information, said means for checking the integrity being either a table contained in the processing device or a plurality of software program instructions of the storage device or a specific hardware circuit, the method comprising at least the following steps:
selecting a piece of sensitive information stored in the storage device addressed by the processing means;
determining, by the means for checking the integrity, a specific condition for establishing the integrity of said sensitive information to be transmitted on said data bus;
transferring a datum of said sensitive information from the storage device to the processing device, on said data bus;
verifying said datum transferred on said data bus, by said means for checking the integrity for verifying that said specific condition is satisfied; and
disabling the processing of said sensitive information by the processing device if the specific condition is not satisfied,
wherein said means for checking the integrity comprises a first and a second logic operator disposed in an entry and an output of the data bus, respectively, and producing a first and a second result, respectively, the means for checking the integrity further comprising a logic comparator for comparing said first and second result, and for verifying said specific condition for the integrity by checking an equality between said first and second results.

15. The method according to claim 14, wherein said first and second logic operators are parity generators each having two logic opposite outputs and one logic selection input that determines which of said two logic opposite outputs is input in the comparator.

16. The method according to claim 15, wherein said logic selection input of the comparators is set to a calculation data whose value varies as a function of time.

17. The method according to claim 15, wherein said logic selection input of both comparators is set to a calculation data whose value varies randomly.

18. A security module comprising an electronic circuit having a monolithic structure and comprising an information processing device, an information storage device communicating with said processing device via a data bus, the processing device selecting sensitive information data extracted from the storage device in order to process them, the security module further comprising means for checking the integrity of information being either a table contained in the processing device or a plurality of software program instructions of the storage device or a specific hardware circuit, wherein said means for checking the integrity verifies a specific condition for integrity by verifying a datum of said sensitive information, transferred on the data bus, the security module further comprising means for disabling the processing of said sensitive information by the processing device when said specific condition for integrity is not satisfied,
wherein said means for checking the integrity of information comprises a first and a second parity generator respectively disposed in an entry and an output of the data bus, and a comparator whose inputs are connected to outputs of said first and second parity generators to verify said specific condition for integrity when said first and second parity generators produce identical outputs, and to set an output of said comparator linked to an interrupt input of the processing device.

19. The security module according to claim 18, wherein said outputs of said first and second parity generators are set opposite according to a function of time.

20. The security module according to claim 18, wherein said outputs of said first and second parity generators are set opposite randomly.

* * * * *